(12) United States Patent
Kubota et al.

(10) Patent No.: US 10,858,750 B2
(45) Date of Patent: Dec. 8, 2020

(54) TIN-PLATED COPPER TERMINAL MATERIAL, TERMINAL AND ELECTRIC WIRE TERMINAL-END STRUCTURE

(71) Applicant: MITSUBISHI MATERIALS CORPORATION, Tokyo (JP)

(72) Inventors: Kenji Kubota, Naka (JP); Yoshie Tarutani, Naka (JP); Takashi Tamagawa, Naka (JP); Kiyotaka Nakaya, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 16/633,247

(22) PCT Filed: Jul. 26, 2018

(86) PCT No.: PCT/JP2018/028048
§ 371 (c)(1),
(2) Date: Jan. 23, 2020

(87) PCT Pub. No.: WO2019/022188
PCT Pub. Date: Jan. 31, 2019

(65) Prior Publication Data
US 2020/0173049 A1 Jun. 4, 2020

(30) Foreign Application Priority Data
Jul. 28, 2017 (JP) .................................. 2017-147082

(51) Int. Cl.
*B32B 15/20* (2006.01)
*H01R 4/18* (2006.01)
(Continued)

(52) U.S. Cl.
CPC .............. *C25D 5/505* (2013.01); *B32B 15/20* (2013.01); *C25D 3/12* (2013.01); *C25D 3/22* (2013.01);
(Continued)

(58) Field of Classification Search
None
See application file for complete search history.

(56) References Cited

U.S. PATENT DOCUMENTS
2018/0347062 A1    12/2018   Kubota et al.

FOREIGN PATENT DOCUMENTS
JP    2008-285729 A    11/2008
JP    2011-219822 A    11/2011
(Continued)

OTHER PUBLICATIONS

International Search Report dated Oct. 9, 2018, issued for PCT/JP2018/028048.

*Primary Examiner* — Adam Krupicka
(74) *Attorney, Agent, or Firm* — Locke Lord LLP (57) ABSTRACT

Providing a tin-plated terminal material with high corrosion-prevention effect and low contact resistance, a terminal formed from the terminal material, and an electric wire terminal-end structure. Provided are a base material made of copper or copper alloy, a zinc layer made of zinc or zinc alloy formed on the base material, and a tin layer made of tin or tin alloy formed on the zinc layer: in a whole of the zinc layer and the tin layer, a tin amount per unit area is 0.30 mg/cm$^2$ to 7.00 mg/cm$^2$ inclusive, a zinc amount per unit area is 0.07 mg/cm$^2$ to 2.00 mg/cm$^2$ inclusive, a content percentage of zinc in a vicinity of a surface in the tin layer is 0.2% to 10% by mass inclusive, and a length proportion of low-angle grain boundaries occupied in a total length of crystal boundaries in the tin layer is 2% to 30% inclusive.

20 Claims, 3 Drawing Sheets

(51) Int. Cl.
  *C25D 5/50*   (2006.01)
  *C25D 3/12*   (2006.01)
  *C25D 3/22*   (2006.01)
  *C25D 3/30*   (2006.01)
  *C25D 7/00*   (2006.01)
  *H01R 4/62*   (2006.01)
  *H01R 13/03*  (2006.01)

(52) U.S. Cl.
  CPC ................ *C25D 3/30* (2013.01); *C25D 7/00* (2013.01); *H01R 4/185* (2013.01); *H01R 4/62* (2013.01); *H01R 13/03* (2013.01)

(56) References Cited

FOREIGN PATENT DOCUMENTS

| | | |
|---|---|---|
| JP | 2013-218866 A | 10/2013 |
| JP | 2015-133306 A | 7/2015 |
| JP | 2016-169439 A | 9/2016 |
| JP | 2017-110290 A | 6/2017 |
| WO | 2017/090638 A1 | 6/2017 |

TIN-PLATED COPPER TERMINAL MATERIAL, TERMINAL AND ELECTRIC WIRE TERMINAL-END STRUCTURE

BACKGROUND OF THE INVENTION

Technical Field

The present invention relates to a tin-plated copper terminal material having high corrosion-prevention effects and a terminal made of the terminal material, and an electric wire terminal-end structure using the terminal.

Priority is claimed on Japanese Patent Application No. 2017-147082, filed Jul. 28, 2017, the content of which is incorporated herein by reference.

Background Art

Conventionally, by connecting a terminal crimped to an end part of a conductive wire to a terminal provided on another device, the conductive wire is connected to the device. The conductive wires and terminals are generally made of copper or copper alloy with high conductivity though, aluminum-made or aluminum-alloy-made conductive wires are also used in order to reduce the weight.

For instance, Patent Document 1 discloses an electric wire with terminal mounted on vehicles such as automobiles, in which a terminal made of copper (copper alloy) having tin plating is crimped to a conductive wire made of aluminum or aluminum alloy.

If the conductive wire is made of aluminum or aluminum alloy and the terminal is made of copper or copper alloy, when water permeates between the terminal and the conductive wire, the conductive wire may corrode by galvanic corrosion owing to a potential difference between different metals, so that the electric resistance value may be increased and a crimping force may be deteriorated at a crimping part.

In order to prevent the galvanic corrosion, in Patent Document 1 for instance, an anti-corrosion layer made of metal (zinc or zinc alloy) having a sacrificial anti-corrosion property with respect to a base material layer is formed between the base material layer and a tin layer of a terminal.

Electric contact material for connector shown in Patent Document 2 has a base material made of metal material, an alloy layer formed on the base material, and a conductive film layer formed on a surface of the alloy layer. The alloy layer essentially contains Sn (tin), and further contains one or more additive elements selected from Cu, Zn Co, Ni and Pd. As the conductive film layer, one contains $Sn_3O_2(OH)_2$ (hydroxide oxide) is disclosed.

As an example in which Zn is added to Sn, Patent Document 3 discloses an Sn-plated material. The Sn-plated material has an undercoat Ni-plated layer, an intermediate Sn—Cu plated layer and a surface Sn-plated layer in this order on a surface of copper or copper alloy. In this Sn-plated material, the undercoat Ni-plated layer is formed from Ni or Ni alloy; the intermediate Sn—Cu plated layer is formed from Sn—Cu based alloy in which an Sn—Cu—Zn alloy layer is formed at at least a side adjacent to the surface Sn-plated layer; the surface Sn-plated layer is formed from Sn alloy containing Zn with 5 to 1000 ppm by mass; and it is further provided with a Zn high-concentrated layer with a Zn density more than 0.2% to 10% by mass on an outermost surface.

CITATION LIST

Patent Literature

[Patent Document 1] Japanese Unexamined Patent Application, First Publication No. 2013-218866
[Patent Document 2] Japanese Unexamined Patent Application, First Publication No. 2015-133306
[Patent Document 3] Japanese Unexamined Patent Application, First Publication No. 2008-285729

SUMMARY OF INVENTION

Technical Problem

In a case in which the anti-corrosion layer made of zinc or zinc alloy is provided under the tin layer as in Patent Document 1, there is a problem in that adhesiveness of Sn plating to the anti-corrosion layer is deteriorated resulting from Sn substitution when carrying out the Sn plating treatment on the anti-corrosion layer.

In a case in which the conductive film layer containing $Sn_3O_2(OH)_2$ (hydroxide oxide) is provided as in Patent Document 2, there is a problem in that durability is low because defects occur immediately in the conductive film layer when it is exposed in corrosive environment or heating environment. Moreover, if the Sn—Zn alloy (the surface Sn-plated layer) is overlaid on the Sn—Cu based alloy layer (the intermediate Sn—Cu plated layer) and there is the Zn high-concentration layer on the outermost layer, there are problems in that productivity of Sn—Zn alloy plating is poor, and anti-corrosion effect with respect to the conductive wire made of aluminum may be lost when copper in the Sn—Cu base alloy layer is exposed at the surface layer.

Furthermore, it is required to reduce the contact resistance as the contact material for connectors and the like, and especially it is necessary to restrain increase of the contact resistance in sliding abrasion.

The present invention is achieved in consideration of the above circumstances, and has an object to provide a tin-plated copper terminal material with high corrosion-prevention effects and low contact resistance, a terminal formed from the terminal material, and an electric wire terminal-end structure using the terminal.

Solution to Problem

A tin-plated copper terminal material of the present invention includes a base material made of copper or copper alloy; a zinc layer made of zinc alloy, formed on the base material; and a tin layer made of tin alloy, formed on the zinc layer: in the tin-plated copper terminal material, in a whole of the zinc layer and the tin layer, a tin amount per unit area is not less than 0.30 mg/cm$^2$ and not more than 7.00 mg/cm$^2$, and a zinc amount per unit area is not less than 0.07 mg/cm$^2$ and not more than 2.00 mg/cm$^2$; a content percentage of zinc in a vicinity of a surface in the tin layer is not less than 0.2% by mass and not more than 10.0% by mass; and a proportion of a length occupied by a low-angle grain boundaries to a total length of all crystal grain boundaries in the tin layer is not less than 2% and not more than 30%. Here, "the tin amount per unit area in the whole of the zinc layer and the tin layer" means the tin amount contained in the zinc layer and the tin layer at a total thickness×unit area: "the zinc amount per unit area in the whole of the zinc layer and the tin layer" means the zinc amount contained in the zinc layer and the tin layer at the total thickness×unit area.

In the tin-plated copper terminal material, contact resistance is reduced since the surface is the tin layer. As well, since the zinc layer having nearer corrosion potential to aluminum than tin is provided under the tin layer and the tin layer contains zinc, the effect of preventing the corrosion of the conductive wire made of aluminum is high.

In this case, if the tin amount per unit area in the whole of the zinc layer and the tin layer is less than 0.30 mg/cm$^2$, zinc is partly exposed by working and the contact resistance increases. If the tin amount per unit area excesses 7.00 mg/cm$^2$, zinc is not diffused enough to the surface and the corrosion current value rises.

If the zinc amount per unit area is less than 0.07 mg/cm$^2$, zinc is not diffused enough to the surface of the tin layer and the corrosion current value rises. If the zinc amount per unit area excesses 2.00 mg/cm$^2$, zinc is excessively diffused and the contact resistance is high.

If the content percentage of zinc in the vicinity of the surface in the tin layer is more than 10.0% by mass, since a large amount of zinc is exposed on the surface, the contact resistance is deteriorated. If the content percentage of zinc in the vicinity of the surface is less than 0.2% by mass, the anti-corrosion effect is not sufficient. The content percentage of zinc in the vicinity of the surface in the tin layer is preferably not less than 0.4% by mass and not more than 5.0% by mass.

Zinc is diffused to the surface from the zinc layer under the tin layer through the crystal grain boundaries in the tin layer: however, zinc diffusion through the low-angle grain boundaries is slower than through the other crystal grain boundaries; it does not contribute to diffuse zinc (i.e., not to lower the corrosion potential). Accordingly, by suitably setting the proportion of the low-angle grain boundaries, the diffusion rate of zinc can be controlled to be desired. If the length proportion of the low-angle grain boundaries is less than 2%, zinc is excessively supplied and the whiskers are easy to occur. If the length proportion of the low-angle grain boundaries is more than 30%, zinc is not diffused enough, the effect of lowering the corrosion potential is not sufficient, and the corrosion current is high.

In the tin-plated copper terminal material of the present invention, it is preferable that a corrosion potential to a silver-silver chloride electrode be not more than −500 mV and not less than −900 mV. In this case, the corrosion current can be restrained low and the anti-corrosion effect is excellent.

In the tin-plated copper terminal material of the present invention, it is preferable that at least one of the tin layer or the zinc layer contain any one or more of nickel, iron, manganese, molybdenum, cobalt, cadmium or lead as additive elements, an amount of the additive elements per unit area in the whole of the zinc layer and the tin layer be not less than 0.01 mg/cm$^2$ and not more than 0.30 mg/cm$^2$. Here, "the amount of the additive elements per unit area in the whole of the zinc layer and the tin layer" means the amount of the additive elements contained in the zinc layer and the tin layer at the total thickness×unit area.

By containing these additive elements, there are effects of restraining the excessive diffusion of zinc and the occurrence of the whiskers. If the amount of the additive elements per unit area is less than 0.01 mg/cm$^2$, zinc diffuses excessively to the surface of tin, the contact resistance is increased and the effectiveness of reducing the whiskers is poor. If the amount of the additive elements is more than 0.30 mg/cm$^2$, zinc is not sufficiently diffused to and the corrosion current is high.

In the tin-plated copper terminal material of the present invention, it is preferable that an average crystal grain size in the tin layer be not less than 0.5 μm and not more than 8.0 μm.

If the average crystal grain size of the tin layer is less than 0.5 μm, zinc is excessively diffused since density of grain boundaries is too high, the corrosion resistance of the tin layer is deteriorated, the tin layer corrodes in corrosive environment, and the contact resistance to the conductive wire may be deteriorated. If the average crystal grain size is more than 8.0 μm, zinc is not diffused enough, and the effectiveness of preventing corrosion of the conductive wire is poor.

In the tin-plated copper terminal material of the present invention, it is preferable that the zinc amount per unit area be 1 to 10 times of the amount of additive elements per unit area. Since these amounts per unit area have a relation of this range, the occurrence of the whiskers can be more prevented.

In the tin-plated copper terminal material of the present invention, it is preferable that a metallic-zinc layer having a zinc density not less than 5 at. % and not more than 40 at. % and a thickness not less than 1 nm and not more than 10 nm in terms of $SiO_2$ be further provided on the tin layer.

The occurrence of the galvanic corrosion resulting from the contact with the electric wire made of aluminum can be more reliably prevented by the presence of the metallic-zinc layer.

In the tin-plated copper terminal material of the present invention, it is preferable that an undercoat layer made by nickel or nickel alloy, having a thickness not less than 0.10 μm and not more than 5.00 μm and a nickel content percentage not less than 80% by mass be provided between the base material and the zinc layer.

The undercoat layer between the base material and the zinc layer can improve the adhesiveness therebetween, and has a function of preventing the diffusion of copper from the base material made of copper or copper alloy to the zinc layer and the tin layer. If the thickness of the undercoat layer is less than 0.10 μm, the effectiveness of preventing the diffusion of copper is poor; and if it is more than 5.00 μm, breakages are easy to occur by the press working. If the nickel content percentage is less than 80% by mass, the effectiveness of preventing copper from diffusing to the zinc layer and the tin layer is poor.

The tin-plated copper alloy terminal material of the present invention includes a carrier part having a belt-sheet shape and terminal parts arranged along a longitudinal direction of the carrier part with an interval and connected to the carrier part.

A terminal of the present invention is a terminal formed from the above mentioned tin-plated copper terminal material: an electric wire terminal-end structure of the present invention is structured by crimping the terminal to an electric wire having a conductive wire made of aluminum or aluminum alloy.

Advantageous Effects of Invention

According to the tin-plated copper terminal material of the present invention, the zinc layer and the tin layer are provided on the base material and zinc is contained in the tin layer, so that the anti-corrosion effect to the aluminum-made conductive wire is high. Moreover, since the zinc layer is provided between the tin layer and the base material, the galvanic corrosion to the aluminum-made conductive wire is prevented even if the tin layer is lost, and it is possible to restrain the rising of the electric resistance value and the deterioration of the adhesion. Moreover, since the proportion of the low-angle grain boundaries is low, increase of the contact resistance by the sliding-wear can be restrained.

DESCRIPTION OF EMBODIMENTS

Figure 2:
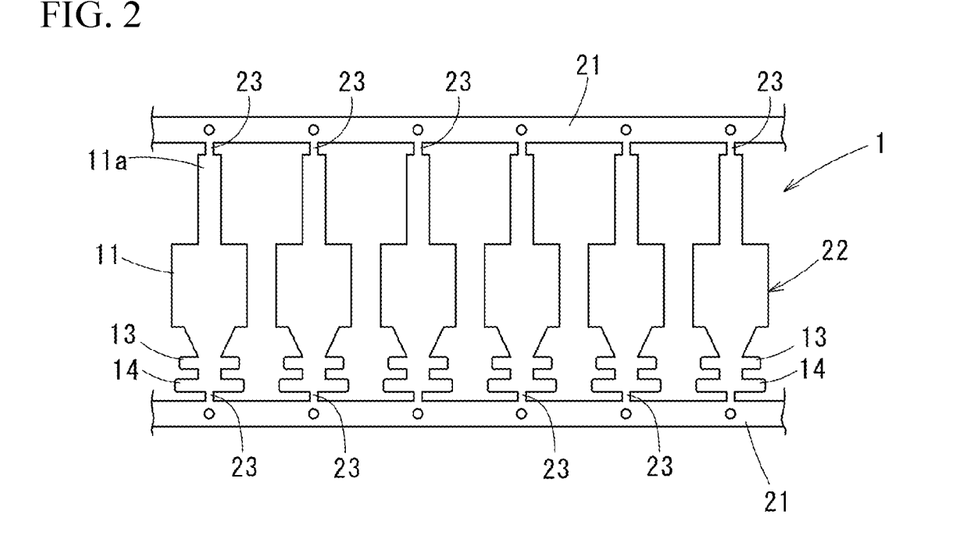
FIG. 2 It is a plan view showing the tin-plated copper alloy terminal material according to the embodiment of the present invention.

A tin-plated copper terminal material 1, a terminal 10 and an electric wire terminal-end structure by the terminal 10 according to an embodiment of the present invention will be explained. The tin-plated copper terminal material 1 of the present embodiment is a strip material formed in a belt sheet shape for forming the terminals 10 as shown in FIG. 2 on the whole: in the material 1, two carrier parts 21 along a longitudinal direction of the strip material and terminal parts 22 to be formed respectively into the terminals 10 arranged with intervals along a longitudinal direction of the carrier parts 21 are connected with narrow connecting parts 23 therebetween. Each of the terminal parts 22 is completed as the terminal 10 by forming into the shape of the terminal 10 shown in FIG. 3 and then cutting off from the connecting parts 23.

In the terminal 10 (a female terminal in an example of FIG. 3), a coat-crimping to part 14 to which a coat 12b of an electric wire 12 is crimped, a core-crimping part 13 to which a core 12a which is a conductive wire exposed from the coat 12b of the electric wire 12, and a tubular coupling part 11 into which a male terminal 15 (refer to FIG. 4) is fit-inserted are formed in this order from an end. An inside of the coupling part 11 is provided with a spring piece 11a formed by folding a small part extended from the tubular part.

Figure 4:
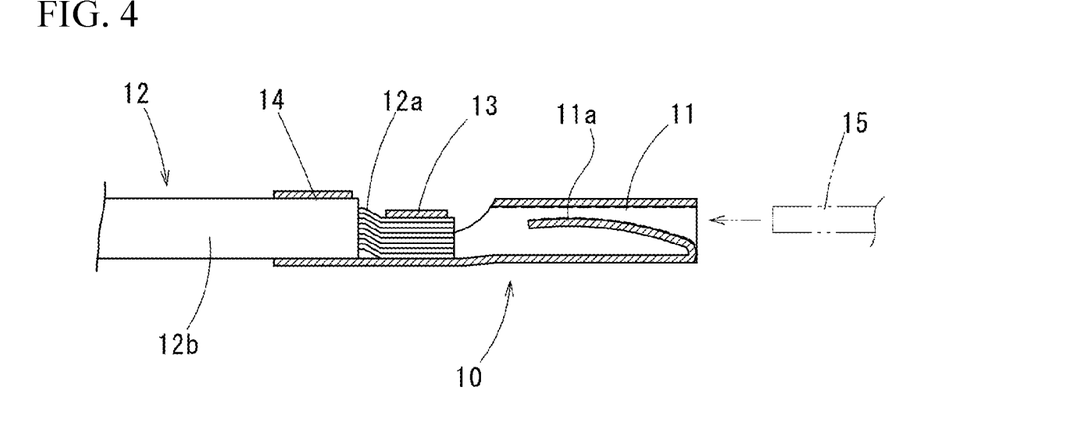
FIG. 4 It is a sectional view showing a terminal-end structure of an electric wire to which the terminal of FIG. 3 is crimped.

FIG. 4 shows an electric wire terminal-end structure crimping the terminal 10 on the electric wire 12. In this structure, the core-crimping part 13 is in directly contact with the core 12a of the electric wire 12. The male terminal 15 inserted into the coupling part 11 is held by being pressed on an inner face of the coupling part 11 by the spring piece 11a.

Figure 1:
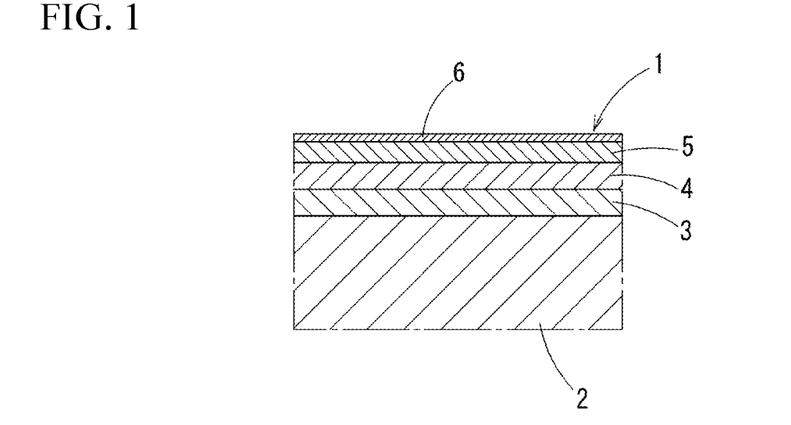
FIG. 1 It is a sectional view schematically showing a tin-plated copper alloy terminal material according to an embodiment of the present invention.

In the tin-plated copper terminal material 1, as schematically showing a section in FIG. 1, on a base material 2 made of copper or copper alloy, laminated are an undercoat layer 3 made of nickel or nickel alloy, a zinc layer 4 made of zinc alloy, and a tin layer 5 made of tin alloy in this order. A female terminal (the terminal 10) made from the tin-plated copper terminal material 1 is explained in this embodiment though, the male terminal 15 can be also made from the tin-plated copper terminal material 1.

A composition of the base material 2 is not specifically limited if it is made of copper or copper alloy.

The undercoat layer 3 made of nickel or nickel alloy has a thickness 0.10 µm to 5.00 µm inclusive and a nickel content percentage not less than 80% by mass. The undercoat layer 3 has functions of improving adhesiveness between the base material 2 and the zinc layer 4 and preventing diffusion of copper from the base material 2 to the zinc layer 4 and the tin layer 5.

The effect of preventing the diffusion of copper is poor if the thickness of the undercoat layer 3 is less than 0.10 µm: if it excesses 5.00 µm, breakages easily occur by press working. The thickness of the undercoat layer 3 is more preferably 0.30 µm to 2.00 µm inclusive.

In a case in which the undercoat layer 3 is made of nickel alloy, if the nickel content percentage is less than 80% by mass, the effect of preventing the diffusion of copper to the zinc layer 4 and the tin layer 5 is poor. The nickel content percentage is more preferably not less than 90% by mass.

Tin and zinc are mutually diffused to the zinc layer 4 and the tin layer 5: in a whole of zinc layer 4 and the tin layer 5, a tin amount per unit area is 0.30 mg/cm$^2$ to 7.00 mg/cm$^2$; and a zinc amount per unit area is 0.07 mg/cm$^2$ to 2.00 mg/cm$^2$.

If the tin amount per unit area is less than 0.30 mg/cm$^2$, contact resistance is increased because zinc is partly exposed by working. If the tin amount per unit area is more than 7.00 mg/cm$^2$, a corrosion current value is increased because zinc is not diffused enough to a surface.

If the zinc amount per unit area is less than 0.07 mg/cm$^2$, the corrosion current value is increased because zinc is not diffused enough to a surface. If the zinc amount per unit area is more than 2.00 mg/cm$^2$, zinc is excessively diffused and the contact resistance is increased.

A content percentage of zinc in the vicinity of a surface in the tin layer 5 is 0.2% to 10.0% by mass, inclusive. If it is more than 10.0% by mass, zinc is excessively exposed at the surface and the contact resistance is deteriorated. If the zinc content percentage is less than 0.2% by mass in the vicinity of the surface, the anti-corrosion effect is not enough. The zinc content percentage in the vicinity of the surface in the tin layer 5 is preferably 0.4% to 5% by mass inclusive.

It is preferable that a thickness of the zinc layer 4 be 0.1 µm to 2.0 µm inclusive, and a thickness of the tin layer 5 be 0.2 µm to 5.0 µm inclusive.

It is preferable that at least one of the zinc layer 4 and the tin layer 5 contain one or more of nickel, iron, manganese, molybdenum, cobalt, cadmium, and lead as additive elements, and an amount of the additive elements be 0.01 mg/cm$^2$ to 0.30 mg/cm$^2$ inclusive per unit area in a whole of the zinc layer 4 and the tin layer 5. In Examples (7 to 21) described later, the zinc layer 4 contains any of these additive elements.

By containing these additive elements, there are effects of preventing the excessive diffusion of zinc and preventing occurrence of whiskers. If the amount of the additive elements per unit area is less than 0.01 mg/cm$^2$, zinc is excessively diffused to the surface of tin, so that the contact resistance is increased and the effect of preventing whiskers is poor. If the amount of the additive elements par unit area is more than 0.30 mg/cm$^2$, zinc is not diffused enough, and corrosion current is high.

It is suitable that an amount of zinc per unit area in a whole of the zinc layer 4 and the tin layer 5 be in a range of not less than one time and not more than 10 times of the amount of the additive elements per area. This range of relation results in prevention of whiskers more effectively.

In the tin layer 5 made of tin alloy, a proportion of a length of low-angle grain boundaries to a total length of all crystal grain boundaries (a length proportion of the low-angle grain boundaries) is 2% to 30% inclusive. Here, the crystal grain boundaries and the low-angle grain boundaries are determined as follows: by measuring by an electron backscatter diffraction pattern method (EBSD or EBSP) using a scanning electron microscope (SEM): two adjacent measurement points which have 2° or larger orientation difference to each other are determined as the crystal boundaries: and the crystal grain boundaries among these crystal grain boundaries in which the orientation difference of adjacent measurement points is less than 15° are determined as the low-angle grain boundaries.

If the length proportion of the low-angle grain boundaries of the tin layer 5 is less than 2%, zinc is excessively supplied and the whiskers are easily generated. If the length proportion of the low-angle grain boundaries is more than 30%, zinc is not diffused enough, so that the effect of lowering corrosion potential on the surface is not enough and the corrosion current is high. It is more suitable that the length proportion of the low-angle grain boundaries of the tin layer 5 be 5% to 15% inclusive.

An average crystal grain size of the tin layer 5 is 0.5 μm to 8.0 μm inclusive. If the average crystal grain size of the tin layer 5 is less than 0.5 μm, density of grain boundaries is too high and zinc is excessively diffused; corrosion resistance of the tin layer 5 is deteriorated, and the tin layer 5 exposed in corrosion environment corrodes; so that the contact resistance may be deteriorated with respect to the core 12a (a bundle of conductive wires made of aluminum) of the electric wire 12. If the average crystal grain size of the tin layer 5 is more than 8.0 μm, zinc is not diffused enough and the effect of preventing the corrosion of the core 12a made of aluminum is poor.

In the vicinity of the surface of the tin layer 5, a metallic-zinc layer 6 is formed resulting from zinc is diffused to the surface from the zinc layer 4 through the tin layer 5. It is more preferable that the metallic-zinc layer 6 have a zinc density of 5 at. % to 40 at. % inclusive and a thickness of 1 nm to 10 nm inclusive in terms of $SiO_2$.

Comparing the corrosion potential with respect to a silver-silver chloride electrode, the corrosion potential of the tin-plated copper terminal material 1 is not more than-500 mV and not less than −900 mV (−500 mV to −900 mV) and the corrosion potential of aluminum is not more than −700 mV and not less than −900 mV: accordingly, the tin-plated copper terminal material 1 has the excellent anti-corrosion effect.

Next, a manufacturing method of the tin-plated copper terminal material 1 will be explained. A sheet material made of copper or copper alloy is provided for the base material 2. By carrying out processes of cutting, punching and the like on this sheet material, a strip material formed by connecting the terminal parts 22 to the carrier parts 21 with the connecting to parts 23 therebetween as shown in FIG. 2 is formed. Then, after a surface of the strip material is cleaned by carrying out treatments of degreasing, pickling and the like; carried out are a nickel plating treatment or a nickel alloy plating treatment for forming the undercoat layer 3, a zinc plating treatment or a zinc alloy plating treatment for forming the zinc layer 4, and a tin plating treatment or a tin alloy plating treatment for forming the tin layer 5 in this order.

The nickel plating treatment or the nickel alloy plating treatment for forming the undercoat layer 3 is not specifically limited if a dense film mainly containing nickel can be obtained: an electro plating using a Watts bath, a sulfamic acid bath, a citric acid bath or the like which are known can be utilized. Utilized as nickel alloy are: nickel-tungsten alloy (Ni—W), nickel-phosphorus alloy (Ni—P), nickel-cobalt alloy (Ni—Co), nickel-chromium alloy (Ni—Cr), nickel-iron alloy (Ni—Fe), nickel-zinc alloy (Ni—Zn), nickel-boron alloy (Ni—B) or the like.

Considering a press bendability in the terminal parts 22 (the terminal 10) and a barrier property on copper, it is desirable to form the undercoat layer 3 by pure nickel plating obtained by the sulfamic acid bath.

The zinc plating treatment or the zinc alloy plating treatment for forming the zinc layer 4 is not specifically limited if a dense film is obtained with a desirable composition. As the zinc plating treatment, a sulfate bath, a chloride bath, a zincate bath or the like which are already known can be utilized. As the zinc alloy plating treatment, utilized are: a zinc nickel alloy plating treatment using a sulfate bath, a chloride bath, or an alkaline bath; a tin zinc alloy plating treatment using a complexing agent bath containing citric acid and the like; a zinc cobalt alloy plating treatment using a sulfate bath; zinc manganese alloy plating treatment using a sulfate bath containing citric acid; or a zinc molybdenum plating treatment using a sulfate bath. An evaporation method can be also utilized.

It is necessary for the tin plating treatment or the tin alloy plating treatment for forming the tin layer 5 to control the length proportion of the low-angle grain boundaries in the tin layer 5 to be an optimal value. For this, an electroplating treatment can be adopt using an organic acid bath (e.g., a phenol sulfonic acid bath, an alkane sulfonic acid bath or an alkanol sulfonic acid bath), an acid bath (a boron hydrofluoric acid bath, a halogen bath, a sulphate bath, a pyrophosphoric acid bath, or the like), or an alkaline bath (a potassium bath or a sodium bath). Considering a high-speed film forming ability, density of the film and an ability of diffusing zinc, it is suitable to use the organic acid bath or the sulfonic acid bath which are acidic and add non-ionic surfactant as additive agent to the bath. In this case, it is possible to control the crystal grain size and the length proportion of the low-angle grain boundaries by setting a bath temperature and the additives. Melting treatments such as reflowing are not carried out because the length proportion of the low-angle grain boundaries is extremely high.

As described above, on the base material 2, carried out are the nickel plating treatment or the nickel alloy plating treatment, the zinc plating treatment or the zinc alloy plating treatment, and the tin plating treatment or the tin alloy plating treatment in this order: then a heat treatment is carried out.

In this heat treatment, the material is heated at temperature in which a surface temperature becomes not less than 30° C. and not more than 190° C. By this heat treatment, zinc in the zinc plating layer or the zinc alloy plating layer is diffused into the tin plating layer. It is adequate to expose at temperature not less than 30° C. for not less than 24 hours because zinc diffuses rapidly. However, since melted tin is repelled by zinc alloy, it is not heated at temperature more than 190° C. so as not to melt tin, in order to form the tin layer 5 over the entire surface.

In order to advance mutual diffusion between the zinc layer 4 and the tin layer 5 in normal temperature, it is important to laminate the tin layer 5 (the tin plating layer or the tin alloy plating layer) after cleansing the surface of the zinc alloy layer 4 (the zinc plating layer or the zinc alloy plating layer). On the surface of the zinc layer 4 (the zinc plating layer or the zinc alloy plating layer), hydroxide or oxide are immediately formed: accordingly, in order to form films continuously by plating treatments, it is suitable to form the film of the tin plating layer or the tin alloy plating layer immediately after cleansing by a sodium hydroxide solution or an ammonium chloride solution removing hydroxide or oxide. When forming the tin layer 5 (the tin plating layer or the tin alloy plating layer) by a dry method such as evaporating, it is suitable to form the film of the tin layer 5 (the tin plating layer or the tin alloy plating layer) after etching the surface of the zinc layer 4 (the zinc plating layer or the zinc alloy plating layer) by an argon spattering treatment.

The tin-plated copper terminal material 1 manufactured as above is on the whole a strip material in which the undercoat layer 3 made of nickel or nickel alloy, the zinc layer 4 made of zinc alloy, the tin layer 5 made of tin alloy, and the metallic-zinc layer 6 are laminated in this order on the base material 2.

Figure 3:
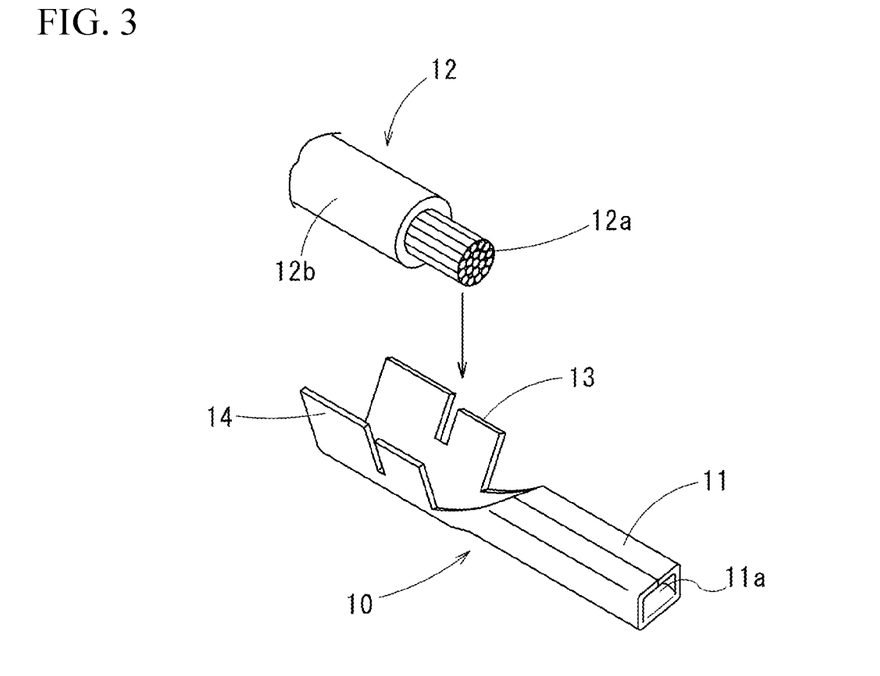
FIG. 3 It is a perspective view showing an example of a terminal formed from the tin-plated copper alloy terminal material according to the embodiment of the present invention.

Then, by press working and the like, the connecting part 23 between the spring piece 11$a$ and the carrier part 21 is cut; the strip material is worked into the shape of the terminal 10 shown in FIG. 3 as the state the coat-crimping part 14 is connected to the carrier part 21; and the connecting part 23 between the coat-crimping part 14 and the carrier part 21 is cut: finally, the terminal 10 is manufactured.

FIG. 4 shows the terminal-end structure in which the terminal 10 is crimped to the electric wire 12. According to this terminal-end structure, the coat-crimping part 14 holds the coat 12$b$ of the electric wire 12 and the core-crimping part 13 is fixed with being in contact directly with the core 12$a$ of the electric wire 12. The male terminal 15 is inserted into the coupling part 11, thereby being held in a state of being connected to the terminal 10.

Since the metallic-zinc layer 6 formed on the tin layer 5 (i.e., on the surface) has the nearer corrosion potential to aluminum than tin, the terminal 10 has high effectiveness of preventing the corrosion of aluminum even in a state of being crimped to the core 12$a$ made of aluminum: therefore, it is possible to effectively prevent the galvanic corrosion from occurring.

Moreover, since the plating treatment and the heat treatment are carried on in the state of being strip material shown in FIG. 2, the base material 2 is not exposed even at the edge surfaces of the terminal 10; accordingly, excellent anti-corrosion effect can be shown.

Furthermore, since the zinc layer 4 is formed under the tin layer 5 and since the metallic-zinc layer 6 and the zinc layer 4 under the tin layer 5 have the corrosion potential near to aluminum; the galvanic corrosion can be reliably prevented even when the metallic-zinc layer 6 and the tin layer 5 on the surface are entirely or partly disappeared by wearing and the like.

Moreover, since the proportion of the low-angle grain boundaries is small in the tin layer 5, abrasion powder generated from the tin layer 5 by micro-sliding wearing has a large grain size: accordingly, there is an effect of restraining increase of the contact resistance by adhesion of minute abrasion powder. Accordingly, the contact resistance can be prevented from increasing owing to the micro-sliding wearing when it is used as the terminal at the terminal-end of various electric wires not only at the electric wire 12 having the core 12$a$ made of aluminum.

The present invention is not limited to the above-described embodiment and various modification may be made without departing from the scope of the present invention.

EXAMPLES

Copper sheets with tin-plating layer were made by carrying out plating treatments with different plating conditions on a copper sheet (the base material) made of C1020 (oxygen-free copper): then a same heat treatment was carried out on the copper sheets with tin-plating layer, so that Samples 1 to 25 were manufactured.

The nickel plating treatment or the nickel alloy plating treatment forming the undercoat layer was not carried out on Samples 1 to 17, 19, 23 and 25. Moreover, on Sample 23 among them, also the zinc plating treatment or the zinc alloy plating treatment was not carried out, the copper sheet was degreased and pickled, then the tin plating treatment was carried out.

For Samples 18, 20 to 22 and 24, after the copper sheets were degreased and pickled, carried out were the nickel plating treatment or the nickel alloy plating treatment forming the undercoat layer, the zinc plating treatment or the zinc alloy plating treatment forming the zinc layer, and the tin plating treatment forming the tin layer in this order. Among them, the undercoat layer was made on Sample 20 by carrying out nickel-phosphorus plating (the nickel alloy plating): on Sample 24 by carrying out nickel-iron plating (the nickel alloy plating) the undercoat layer was made.

Main plating conditions are as follows. Zinc content percentage of the zinc layer which was formed was adjusted by modifying proportion of zinc ion and additive metal element ion in plating solution. For instance, the following condition of nickel zinc alloy plating is an example in which the zinc density in the plating layer is adjusted to 15% by mass.

---Condition of Nickel Plating---
(forming the undercoat layers for Samples 18, 21 and 22)
--Composition of Plating Bath
   Nickel Sulfamate: 300 g/L
   Nickel Chloride: 5 g/L
   Boric Acid: 30 g/L
--Bath Temperature: 45° C.
--Current Density: 5 A/dm$^2$
---Condition of Zinc Plating---
(forming the zinc layers for Samples 1, 3 to 5, 24 and 25)
-Zinc Sulfate Heptahydrate: 250 g/L
-Sodium Sulfate: 150 g/L
-pH=1.2
-Bath Temperature: 45° C.
-Current Density: 5 A/dm$^2$
---Condition of Nickel Zinc Alloy Plating---
(forming the zinc layer for Samples 11, 14 to 22)
--Composition of Plating Bath
   Zinc Sulfate Heptahydrate: 75 g/L
   Nickel Sulfate Hexahydrate: 180 g/L
   Sodium Sulfate: 140 g/L
--pH=2.0
--Bathe Temperature: 45° C.
--Current Density: 5 A/dm$^2$
---Condition of Tin Zinc Alloy Plating---
(forming the zinc layer for Samples 2 and 6)
--Composition of Plating Bath
   Tin (II) Sulfate: 40 g/L
   Zinc Sulfate Heptahydrate: 5 g/L
   Trisodium Citrate: 65 g/L
Nonionic Surfactant: 1 g/L
--pH=5.0
--Bath Temperature: 25° C.
--Current Density: 3 A/dm$^2$
---Condition of Zinc Manganese Alloy Plating---
(forming the zinc layer of Sample 12)
--Composition of Plating Bath
   Manganese Sulfate Monohydrate: 110 g/L
   Zinc Sulfate Heptahydrate: 50 g/L
   Trisodium Citrate: 250 g/L --pH=5.3
--Bath Temperature: 30° C.
--Current Density: 5 A/dm$^2$
---Condition of Zinc Molybdenum Alloy Plating---
(forming the zinc layer of Sample 7)
--Composition of Plating Bath
   Hexaammonium Heptamolybdate Tetrahydrate: 1 g/L
   Zinc Sulfate Heptahydrate: 250 g/L
   Trisodium Citrate: 250 g/L
--pH=5.3
--Bath Temperature: 30° C.
--Current Density: 5 A/dm$^2$
---Condition of Tin Plating---
(forming the tin layer of Samples 1 to 25)
--Composition of Plating Bath
   Stannous Methanesulfonate: 200 g/L
   Methanesulfonic Acid: 100 g/L
   Additive
--Bath Temperature: 35° C.
--Current Density: 5 A/dm$^2$ Next, Samples 1 to 25 were manufactured by carrying out the heat treatment on the copper sheets with plating layer at temperature 30° C. to 190° C. and in a range of 1 hour to 36 hours.

Regarding Samples 1 to 25 which were obtained, measured were: a thickness of the undercoat layer, a nickel content amount in the undercoat layer, a tin amount per unit area in the whole of the zinc layer and the tin layer, a zinc amount per unit area, zinc content percentage in the tin layer, an amount of additive element per unit area other than tin or zinc in the whole of the zinc layer and the tin layer, length proportion of the low-angle grain boundaries in the tin layer, an average crystal grain size of the tin layer, a thickness and zinc density of the metallic-zinc layer at the surface, and the corrosion potential.

The thicknesses of the undercoat layers of Samples were measured by observing a cross section using a scanning ion microscopy.

Observational test-pieces with 100 nm or thinner were made by thinning Samples by using a device of focused ion beam (FIB) made by Seiko Instruments Inc. (model No. SMI3050 TB): the observational test-pieces were observed by using a scanning transmission electron microscope (STEM) made by JEOL Ltd. (model No. JEM-2010F) at acceleration voltage 200 kV: and the nickel content percentage of the undercoat layer was measured by using an energy dispersive X-ray spectrometry device (EDS) made by Thermo Fisher Scientific K.K., belonging to the STEM.

The tin amount per unit area, the zinc amount per unit area, and the amount of the additive elements in the whole of the zinc layer and the tin layer were measured as follows. The test pieces which were masked so that an exposed area was a prescribed value were soaked in plating stripping solution (product name: Stripper L-80) with a prescribed amount made by Laybold Co., Ltd., so that the tin layer and the zinc layer were completely dissolved. The solution was prepared to a prescribed amount by adding dilute hydrochloric acid, each concentration of elements in the solution was measured by using a frame atom light absorption photometer. By using the above mentioned plating stripping solution, it is possible to measure the amount of elements contained in the zinc layer and the tin layer without dissolving the base material and the nickel plating layer.

Regarding the content percentage of zinc in the vicinity of the surface in the tin layer, using an electron probe micro analyzer (EPMA) made by JEOL Ltd. (model No. JXA-8530F), the surfaces of the test pieces were measured with an acceleration voltage 6.5 V and a beam diameter 30 μm. The zinc content percentage at a depth about 0.3 μm from the surface of the tin layer was measured by low acceleration voltage 6.5 kV.

The average crystal grain size in the tin layer was measured by an area fraction, by specify crystal grain boundaries in which orientation difference was not less than 2° between adjacent measurement points, by orientation analysis of the EBSD method scanning the surface of the tin layer by electron beam.

Regarding the low-angle grain boundaries in the tin layer, after cleaning the surface using a flat milling device (made by Hitachi High-Technologies Corporation), the crystal grain boundaries were measured by an EBSD measurement device (S4300-SE made by Hitachi High-Technologies Corporation; OIM Data Collection made by TSL Solutions Inc./EDAX Business unit Ametek Co., Ltd.) and analysis software (OIM Data Analysis ver. 5.2 made by TSL Solutions Ltd./EDAX Business Unit Ametek Co., Ltd.). The length proportion of the low-angle grain boundaries in the total crystal grain boundaries was analyzed by calculating the length of the crystal grain boundaries from the measurement results.

Namely, positions of the low-angle grain boundaries were determined by the orientation analysis by the electron backscatter diffraction with irradiating the electron beam to the respective measurement points (pixels) in a measuring area on the surface of the test pieces as follows: if the orientation difference between the adjacent measurement points was not less than 2°, the measurement points were deemed to be the crystal grain boundary, and if the orientation difference between the adjacent measurement points was not less than 2° and less than 15°, the measurement points were determined to be the low-angle grain boundary. Then, a total length L of the grain boundaries and a total length Lσ of the low-angle grain boundaries in the measurement area were measured, and a proportion Lσ/L was determined as the length proportion of the low-angle grain boundaries.

Conditions of the EBSD method, observation condition in the scanning electron microscope SEM (SEM condition) are as follows. The surfaces of the test pieces were prepared by the ion milling device with the acceleration voltage 6 kV for irradiation time 2 hours, then measured and observed.
---EBSD Condition---
Analysis Area: 10.0 μm×50.0 μm (measurement area: 10.0 μm×50.0 μm)
Measurement Step: 0.1 μm
Capture Time: 11 msec/point
---SEM Condition---
Acceleration Voltage: 15 kV
Beam Current: about 3.5 nA
WD: 15 mm The thickness and the zinc density of the metallic-zinc layer of the test pieces were measured by XPS analysis while etching the surfaces of the test pieces by argon ion, using the XPS (X-ray Photoelectron Spectroscopy) analysis device (ULVAC PHI model-5600LS) made by Ulvac-Phi, Incorporated. Condition of XPS analysis is as follows.
---XPS Analysis Condition---
X-ray Source: Standard MgKα 350 W
Path Energy: 187.85 eV (Survey), 58.70 eV (Narrow)
Measurement Step: 0.8 eV/step (Survey), 0.125 eV (Narrow)
Photoelectron Extraction Angle: 45 deg
Analysis Area: about 800 μm (diameter)

Regarding the thickness of the metallic-zinc layer of the test pieces, measured was a "film thickness in terms of $SiO_2$" calculated from time necessary for measuring the metallic-zinc layer using an etching rate of SiO2 previously measured by the same device (the above mentioned XPS analysis device).

The etching rate of SiO2 in the above mentioned XPS analysis device was calculated as time necessary for etching a thickness 1 nm by carrying out the etching on an $SiO_2$ film with a thickness 20 nm by argon ion (Ar ion) beam with respect to a rectangular region of 2.8 mm×3.5 mm Namely, in a case of the above mentioned XPS analysis device, it was necessary to etch the $SiO_2$ film with the thickness 20 nm for 8 minutes: accordingly, the etching rate is 2.5 nm/min.

The XPS analysis device is excellent as depth resolution is about 0.5 nm: however, etching rates by Ar ion beam are different in accordance with materials, in order to obtain a film thickness, flat test pieces having known film thicknesses should be prepared for respective materials and etching rates must be calculated for the material and set to be references. Because this method is not easy, the "film thickness in terms of $SiO_2$" was calculated from the etching rate of $SiO_2$ and time necessary for etching the object.

Accordingly, the "film thicknesses in terms of $SiO_2$" of the metallic-zinc layer in the test pieces are different from real film thicknesses. However, even if the real film thicknesses are not certain, it is possible to evaluate the film thicknesses by the same one reference of the "film thickness in terms of $SiO_2$".

The test pieces were cut into 10×50 mm, covered at exposing parts of copper (the base material) such as the end surfaces by epoxy resin, soaked in a sodium chloride aqueous solution of 23° C. and 5% by mass: using a zero shunt ammeter (HA1510 made by Hokuto Denko Corporation), in which a reference electrode is a silver-silver chloride electrode (Ag/AgCl electrode, a double junction type made by Metrohm Japan Ltd.), in which saturated potassium chloride solution is filled as internal cylinder fluid, the corrosion potential was obtained as an average value of natural potential measured at 1 minute step for 24 hours.

The measuring results are shown in Table 1. Additive elements contained in the zinc layer or the tin layer are shown in parentheses in boxes of the additive element amount in the zinc layer and the tin layer. Regarding Samples 1, 2, 23 and 25, the metallic-zinc layer was not found.

TABLE 1

| SAMPLE No. | UNDERCOAT LAYER THICKNESS (µm) | UNDERCOAT LAYER Ni CONTENT PERCENTAGE (% by mass) | ZINC LAYER AND TIN LAYER TIN AMOUNT (mg/cm²) | ZINC LAYER AND TIN LAYER ZINC AMOUNT (mg/cm²) | ZINC LAYER AND TIN LAYER ZINC CONTENT PERCENTAGE (% by mass) IN TIN LAYER | ZINC LAYER AND TIN LAYER ADDITIVE ELEMENT AMOUNT (mg/cm²) | TIN LAYER LENGTH PROPORTION OF LOW-ANGLE GRAIN BOUNDARIES (%) | TIN LAYER AVERAGE CRYSTAL GRAIN SIZE (µm) | METAL-ZINC LAYER FILM THICKNESS IN TERMS OF SiO₂ (nm) | METAL-ZINC LAYER ZINC DENSITY (%) | CORROSION POTENTIAL (mV vs. Ag/AgCl) |
|---|---|---|---|---|---|---|---|---|---|---|---|
| 1 | 0 | — | 0.3 | 0.1 | 0.3 | — | 30 | 0.3 | — | — | −490 |
| 2 | 0 | — | 2.5 | 0.07 | 0.2 | — | 27 | 8.5 | — | — | −450 |
| 3 | 0 | — | 1.1 | 2.0 | 10.0 | — | 2 | 0.2 | 12 | 55 | −920 |
| 4 | 0 | — | 7.0 | 1.5 | 8.0 | — | 3 | 9.0 | 15 | 62 | −980 |
| 5 | 0 | — | 6.0 | 1.2 | 4.0 | — | 25 | 8.5 | 0.5 | 3 | −500 |
| 6 | 0 | — | 1.4 | 0.08 | 6.0 | — | 3 | 0.3 | 14 | 50 | −900 |
| 7 | 0 | — | 3.0 | 1.0 | 4.0 | 0.05(Mo) | 16 | 0.3 | 12 | 46 | −850 |
| 8 | 0 | — | 3.0 | 1.0 | 7.2 | 0.07(Pb) | 9 | 0.3 | 15 | 58 | −880 |
| 9 | 0 | — | 2.0 | 1.0 | 3.0 | 0.04(Cd) | 10 | 0.3 | 19 | 51 | −790 |
| 10 | 0 | — | 3.0 | 0.5 | 5.5 | 0.01(Fe) | 19 | 0.3 | 23 | 60 | −850 |
| 11 | 0 | — | 3.0 | 2.0 | 0.6 | 0.3(Ni) | 20 | 0.3 | 22 | 45 | −780 |
| 12 | 0 | — | 3.0 | 1.0 | 6.2 | 0.12(Mn) | 4 | 8.5 | 0.5 | 3 | −520 |
| 13 | 0 | — | 3.0 | 1.0 | 1.2 | 0.06(Co) | 6 | 0.4 | 12 | 40 | −790 |
| 14 | 0 | — | 4.0 | 1.5 | 2.0 | 0.1(Ni) | 10 | 0.5 | 13 | 45 | −770 |
| 15 | 0 | — | 5.0 | 0.7 | 0.6 | 0.08(Ni) | 7 | 8.0 | 14 | 48 | −690 |
| 16 | 0 | — | 4.5 | 0.9 | 1.5 | 0.09(Ni) | 5 | 5.0 | 11 | 42 | −670 |
| 17 | 0 | — | 4.5 | 0.9 | 1.5 | 0.11(Ni) | 4 | 2.0 | 12 | 43 | −680 |
| 18 | 0.05 | 100 | 5.5 | 0.3 | 0.8 | 0.04(Ni) | 4 | 2.0 | 10 | 40 | −650 |
| 19 | 0 | — | 3.5 | 0.4 | 0.7 | 0.15(Ni) | 4 | 2.0 | 1 | 5 | −660 |
| 20 | 0.1 | 90(Ni—P) | 1.8 | 0.4 | 0.5 | 0.06(Ni) | 5 | 1.5 | 2.5 | 16 | −720 |
| 21 | 5 | 100 | 2.5 | 0.1 | 0.5 | 0.04(Ni) | 8.5 | 2.4 | 1 | 5 | −690 |
| 22 | 0.5 | 100 | 0.9 | 0.6 | 0.5 | 0.02(Ni) | 7 | 4.0 | 3 | 15 | −620 |
| 23 | 0 | — | 1.0 | 0 | 0 | 0 | 71 | 9.1 | — | — | −420 |
| 24 | 5.6 | 70(Ni—Fe) | 0.2 | 2.5 | 11 | — | 1 | 0.1 | 20 | 60 | −920 |
| 25 | 0 | — | 7.5 | 0.05 | 0.1 | — | 41 | 0.1 | — | — | −430 |

Regarding Samples 1 to 25 which were obtained, the corrosion current, bending workability, occurrences of whiskers, the contact resistance, cycle number of resistance rising by micro-sliding wear test were measured and evaluated. These results are shown in Table 2.

---Corrosion Current---

Pure aluminum wire coated with resin excluding an exposed part of 2 mm diameter and the test piece coated with resin excluding an exposed part of 6 mm diameter are arranged so that the exposed parts are face to each other with a distance 1 mm in salt solution of 23° C. and 5% by mass: using the zero shunt ammeter (HA1510 made by Hokuto Denko Corporation), current flowing between the pure aluminum wire and the test piece was measured before and after heating the test piece at 150° C. for 1 hour, as the corrosion current.

---Bending Workability---

Regarding the bending workability, bending work was carried on the respective test pieces at a load of $9.8 \times 10^3$ N in a perpendicular direction to a rolling direction using a W-bending test jig regulated in JIS (Japanese Industrial Standard) H3110. By results of observation of the bending worked part by a stereoscopic microscope, the test pieces after the bending work were evaluated as "excellent" (A) if any definite crack was not found, "good" (B) if copper alloy of the base material was not exposed even if cracks occurred, or "bad" (D) if copper alloy of the base material was exposed by the cracks.

work of R=1 mm was carried on was pressurized against a flat-sheet test piece at a load 1 N, and was repeatedly slid at a sliding rate 1 Hz, a movement length 50 μm: contact resistance was measured while sliding at a current value 10 mA and a release voltage 20 mV: it was evaluated by a reciprocating cycle number in which the contact resistance amounted to 10 mΩ. If it amounted to 10 mΩ while the reciprocating cycle number was less than 50, it was "bad" (D): if it was not less than 50 and less than 100, it was "acceptable" (C): if it was not less than 100 and less than 150, it was "good" (C): or if it was not less than 150, it was "excellent" (A).

TABLE 2

| SAMPLE No. | CORROSION CURRENT (μA) BEFORE HEATING | CORROSION CURRENT (μA) AFTER HEATING | BENDING WORK-ABILITY | WHISKERS | CONTACT RESISTANCE (mΩ) | MICRO-SLIDING WEAR TEST |
|---|---|---|---|---|---|---|
| 1 | 4.5 | 6.1 | B | C | 2.0 | B |
| 2 | 3.1 | 6.5 | B | C | 2.1 | C |
| 3 | 4.2 | 5.5 | B | C | 3.0 | A |
| 4 | 5.0 | 5.5 | B | C | 2.8 | B |
| 5 | 3.9 | 4.9 | B | C | 2.1 | C |
| 6 | 3.6 | 4.7 | B | C | 2.2 | B |
| 7 | 3.0 | 5.5 | B | B | 1.7 | B |
| 8 | 3.2 | 4.0 | B | B | 1.6 | B |
| 9 | 2.5 | 4.5 | B | B | 2.0 | B |
| 10 | 1.9 | 3.7 | B | B | 1.6 | C |
| 11 | 3.3 | 5.9 | B | B | 1.8 | C |
| 12 | 4.0 | 6.1 | B | B | 0.9 | B |
| 13 | 2.5 | 4.9 | B | B | 2.1 | B |
| 14 | 3.0 | 4.0 | B | B | 0.9 | B |
| 15 | 2.8 | 3.8 | B | B | 0.8 | B |
| 16 | 1.5 | 2.0 | B | A | 0.4 | B |
| 17 | 1.9 | 2.3 | B | A | 0.6 | B |
| 18 | 0.6 | 1.1 | B | A | 0.7 | B |
| 19 | 0.9 | 1.0 | B | A | 0.9 | B |
| 20 | 0.2 | 0.3 | A | A | 0.4 | A |
| 21 | 0.3 | 0.3 | A | A | 0.4 | B |
| 22 | 0.3 | 0.4 | A | A | 0.4 | A |
| 23 | 8.5 | 8.5 | B | C | 0.6 | D |
| 24 | 7.8 | 7.5 | D | D | 5.2 | C |
| 25 | 8.1 | 8.2 | D | D | 0.7 | D |

---Occurrence of Whiskers---

Regarding the occurrence of whiskers, the test piece was cut into a rectangular flat sheet of 1 cm×1 cm, left in temperature 55° C., relative humidity 95% RH for 1000 hours; then observed at 3 view fields with a magnification of 100 by an electron microscope so that a length of the longest whisker was measured. If any occurrence of whisker was not found, it was evaluated "excellent" (A); if the length of the whisker was less than 50 μm, it was evaluated as "good" (B); if the length of the whisker was no less than 50 μm and less than 100 μm, it was evaluated as "acceptable" (C); or if the length of the whisker was not less than 100 μm, it was evaluated as "bad" (D).

---Contact Resistance---

Regarding the contact resistance, conforming "the measuring method of surface electrical contact resistance" JCBA-T323 regulated by Japan Copper and Brass Association, 4-terminal contact resistance test device (CRS-113-AU made by Yamasaki Seiki Research Institute) was used; the contact resistance at a load 1 N with a sliding type was measured on plating surfaces of the flat sheet test pieces.

---Micro-sliding Wear Test---

By conforming the above mentioned JCBA-T323, and using a micro-sliding wear test device made by Yamasaki Seiki Research Institute: a test piece in which a protrusion From the results shown in Table 1 and Table 2, in Samples 1 to 22, in which the tin amount per unit area is 0.30 mg/cm² to 7.00 mg/cm² inclusive and the zinc amount per unit area is 0.07 mg/cm² to 2.00 mg/cm² inclusive in the whole of the zinc layer and the tin layer, the content percentage of zinc in the vicinity of the surface in the tin layer is 0.2% to 10.0% by mass inclusive, and the length proportion of the low-angle grain boundaries in the tin layer is 2% to 30% inclusive, it is found that the corrosion current is low, the bending workability is good, the occurrence of the whiskers is not found, or the length thereof is short even if the whiskers occur, and the contact resistance is low.

Among those, in Samples 7 to 22 containing any of the additive elements nickel, iron, manganese, molybdenum, cobalt, cadmium, and lead at 0.01 mg/cm² to 0.30 mg/cm² inclusive, the occurrence of the whiskers is remarkably reduced. In Samples 20 to 22, since the undercoat layer having the thickness 0.1 μm to 5 μm inclusive and the nickel content percentage is not less than 80% by mass is formed between the base material and the zinc layer, the corrosion-prevention effects is higher even after heating than Samples without the undercoat layer or Sample 18 which is thin even though there is the undercoat layer.

Whereas Sample 23 which is a comparative example does not have the zinc layer (zinc is not contained), so that the corrosion potential was high and the corrosion current was high. In Sample 24, the tin amount per unit area is small, the zinc content per unit area is large, and the nickel content percentage in the undercoat layer is low; so that the corrosion current value is high: the bending workability was poor since the nickel undercoat layer is thick: the length proportion of the low-angle grain boundaries is low as less than 2% and the zinc is excessively diffused, so that zinc runs out and the corrosion potential is not more than −900 mV vs. Ag/AgCl, and the contact resistance is deteriorated. In Sample 25, since the tin amount per unit area is large and the zinc amount per unit area is small, the corrosion current value was high and cracks occurred when the bending work.

Figure 5:
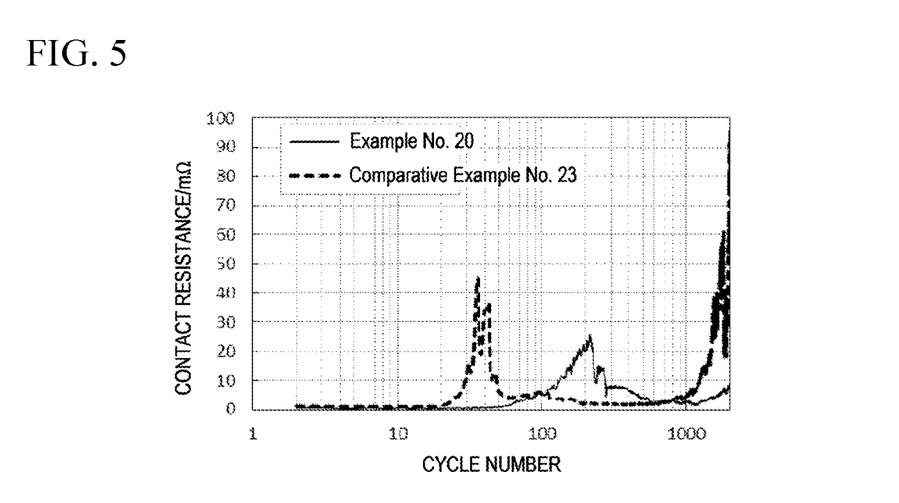
FIG. 5 It is a graph showing measurement results of contact resistance of Sample 20 and Sample 23 of micro-sliding wear test.

FIG. 5 shows changes of contact resistance with the increase of the cycle number from the results of measuring the contact resistances of Sample 20 and Sample 23 when the micro-sliding wear test was carried out. As shown by the graph, in the comparative example (Sample 23) the contact resistance was increased until when the reciprocating sliding number reached several tens of cycles: in the example (Sample 20) the contact resistance was rarely increased until it reached about 150 cycles.

INDUSTRIAL APPLICABILITY

Since the zinc layer and the tin layer are provided on the base material and the tin layer contains zinc, the anti-corrosion effect to the conductive wire made of aluminum is high. Moreover, by providing the zinc layer between the tin layer and the base material, the galvanic corrosion on the conductive wire made of aluminum is prevented even if the tin layer is lost, and it is possible to prevent the electric resistance value from rising and the adhesion from reducing. Moreover, since the proportion of the low-angle grain boundaries is small, the contact resistance can be prevented from rising by sliding wear.

REFERENCE SIGNS LIST

1 Tin-plated copper terminal material
2 Base material
3 Undercoat layer
4 Zinc layer
5 Tin layer
6 Metallic-zinc layer
10 Terminal
11 Coupling part
11a Spring piece
12 Electric wire
12a Core
12b Coat
13 Core-crimping part
14 Coat-crimping part
15 Male terminal
21 Carrier part
22 Terminal part
23 Connecting part

The invention claimed is:

1. A tin-plated copper terminal material comprising:
a base material made of copper or copper alloy;
a zinc layer made of zinc alloy, formed on the base material; and
a tin layer made of tin alloy, formed on the zinc layer, wherein
in a whole of the zinc layer and the tin layer, a tin amount per unit area is not less than 0.30 mg/cm$^2$ and not more than 7.00 mg/cm$^2$, and a zinc amount per unit area is not less than 0.07 mg/cm$^2$ and not more than 2.00 mg/cm$^2$;
a content percentage of zinc in a vicinity of a surface in the tin layer is not less than 0.2% by mass and not more than 10.0% by mass; and
a proportion of a length occupied by a low-angle grain boundaries to a total length of all crystal grain boundaries in the tin layer is not less than 2% and not more than 30%.

2. The tin-plated copper terminal material according to claim 1, wherein a corrosion potential to a silver-silver chloride electrode is not more than −500 mV and not less than −900 mV.

3. The tin-plated copper terminal material according to claim 2, wherein
at least one of the tin layer or the zinc layer contains any one or more of nickel, iron, manganese, molybdenum, cobalt, cadmium or lead as additive elements,
an amount of the additive elements per unit area in the whole of the zinc layer and the tin layer is not less than 0.01 mg/cm$^2$ and not more than 0.30 mg/cm$^2$.

4. The tin-plated copper terminal material according to claim 2, wherein an average crystal grain size in the tin layer is not less than 0.5 μm and not more than 8.0 μm.

5. The tin-plated copper terminal material according to claim 2, wherein the zinc amount per unit area is one to ten times of the amount of the additive elements per unit area.

6. The tin-plated copper terminal material according to claim 2, further comprising a metallic-zinc layer on the tin layer, having a zinc density not less than 5 at. % and not more than 40 at. % and a thickness not less than 1 nm and not more than 10 nm in terms of SiO$_2$.

7. The tin-plated copper terminal material according to claim 2, wherein an undercoat layer made of nickel or nickel alloy, having a thickness not less than 0.1 μm and not more than 5 μm and a nickel content percentage not less than 80% by mass is provided between the base material and the zinc layer.

8. The tin-plated copper terminal material according to claim 2, comprising
a carrier part having a belt-sheet shape; and
terminal parts arranged along a longitudinal direction of the carrier part with an interval and connected to the carrier part.

9. A terminal formed from the tin-plated copper terminal material according to claim 2.

10. The tin-plated copper terminal material according to claim 1, wherein
at least one of the tin layer or the zinc layer contains any one or more of nickel, iron, manganese, molybdenum, cobalt, cadmium or lead as additive elements,
an amount of the additive elements per unit area in the whole of the zinc layer and the tin layer is not less than 0.01 mg/cm$^2$ and not more than 0.30 mg/cm$^2$.

11. The tin-plated copper terminal material according to claim 10, wherein an average crystal grain size in the tin layer is not less than 0.5 μm and not more than 8.0 μm.

12. The tin-plated copper terminal material according to claim 10, wherein the zinc amount per unit area is one to ten times of the amount of the additive elements per unit area.

13. The tin-plated copper terminal material according to claim 10, further comprising a metallic-zinc layer on the tin layer, having a zinc density not less than 5 at. % and not more than 40 at. % and a thickness not less than 1 nm and not more than 10 nm in terms of SiO$_2$.

14. The tin-plated copper terminal material according to claim 1, wherein an average crystal grain size in the tin layer is not less than 0.5 μm and not more than 8.0 μm.

15. The tin-plated copper terminal material according to claim 1, wherein the zinc amount per unit area is one to ten times of the amount of the additive elements per unit area.

16. The tin-plated copper terminal material according to claim 1, further comprising a metallic-zinc layer on the tin layer, having a zinc density not less than 5 at. % and not more than 40 at. % and a thickness not less than 1 nm and not more than 10 nm in terms of $SiO_2$.

17. The tin-plated copper terminal material according to claim 1, wherein an undercoat layer made of nickel or nickel alloy, having a thickness not less than 0.1 μm and not more than 5 μm and a nickel content percentage not less than 80% by mass is provided between the base material and the zinc layer.

18. The tin-plated copper terminal material according to claim 1, comprising
    a carrier part having a belt-sheet shape; and
    terminal parts arranged along a longitudinal direction of the carrier part with an interval and connected to the carrier part.

19. A terminal formed from the tin-plated copper terminal material according to claim 1.

20. An electric wire terminal-end structure wherein the terminal according to claim 19 is crimped to an electric wire comprising a conductive wire made of aluminum or aluminum alloy.

* * * * *